May 24, 1932.  F. RUTRLE  1,859,716
AIRPLANE
Filed March 12, 1928   3 Sheets-Sheet 1
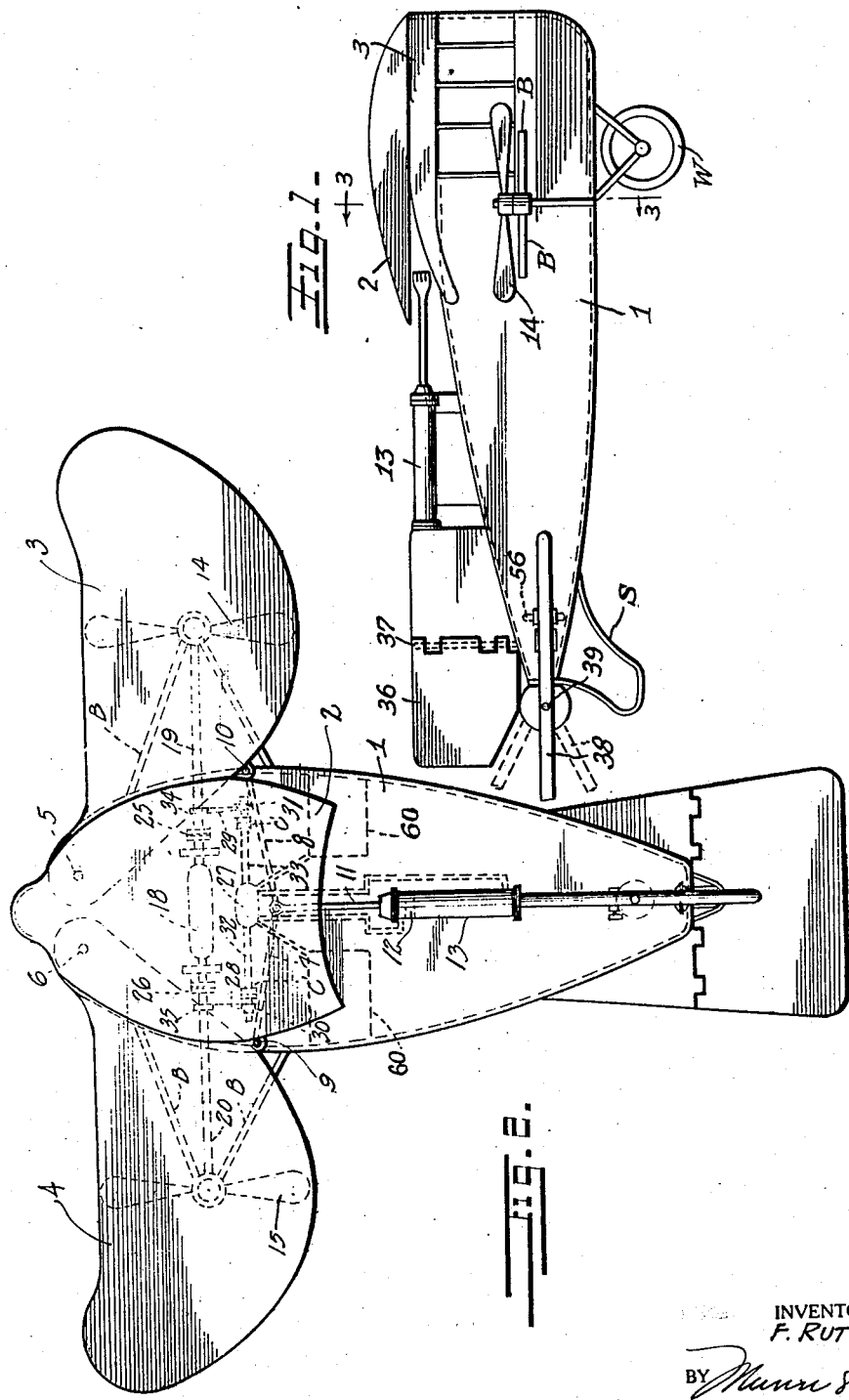
INVENTOR
F. RUTRLE
BY
ATTORNEYS May 24, 1932.  F. RUTRLE  1,859,716
AIRPLANE
Filed March 12, 1928   3 Sheets-Sheet 2
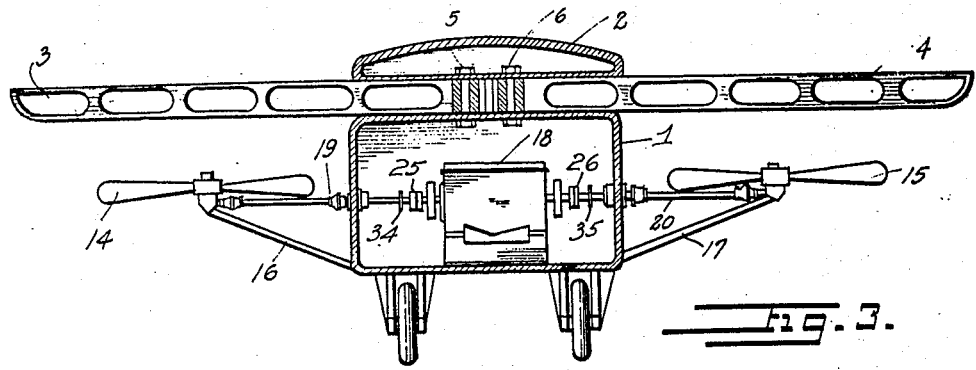
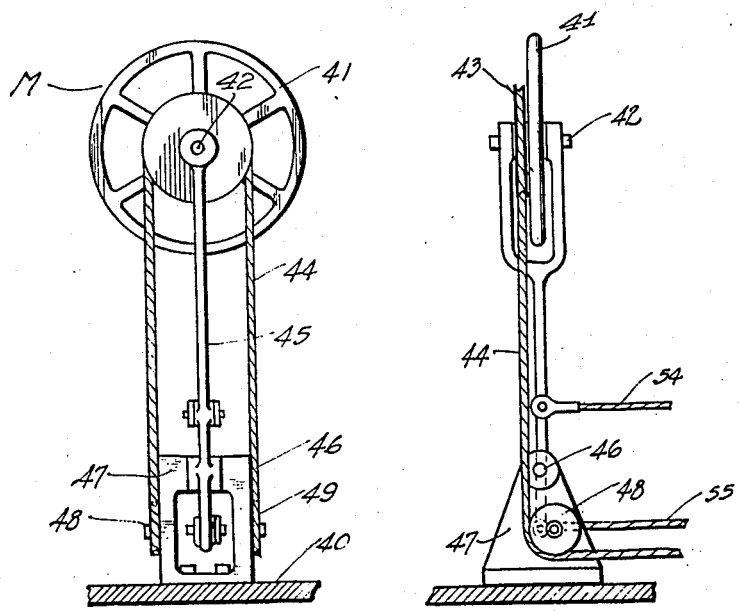
INVENTOR
F. RUTRLE
BY
ATTORNEYS May 24, 1932.  F. RUTRLE  1,859,716
AIRPLANE
Filed March 12, 1928  3 Sheets-Sheet 3

INVENTOR
F. RUTRLE
BY
ATTORNEYS

Patented May 24, 1932

1,859,716

UNITED STATES PATENT OFFICE

FRANK RUTRLE, OF SHELBY, MONTANA

AIRPLANE

Application filed March 12, 1928. Serial No. 261,037.

My invention relates to improvements in airplanes, and it consists in the combinations, constructions, and arrangements herein described and claimed.

An object of my invention is to provide an airplane which is adapted to ascend vertically from the ground, and an airplane which when once it is moving in the air may also be caused to descend vertically with respect to the earth's surface.

A further object is to provide an airplane in which the means employed for causing the airplane to ascend or descend is also employed for causing the airplane to move forwardly.

A further object is to provide an airplane in which means is employed for permitting the airplane to descend with a maximum degree of safety as when the motor stops.

A further object is to provide an airplane in which the wing construction is such as to permit the airplane to be practically collapsed for housing purposes and the like, thereby dispensing with the necessity of disassembling the airplane.

Other objects and advantages will appear in the following specification, and the novel features of the invention will be particularly pointed out in the appended claims.

Figure 6:
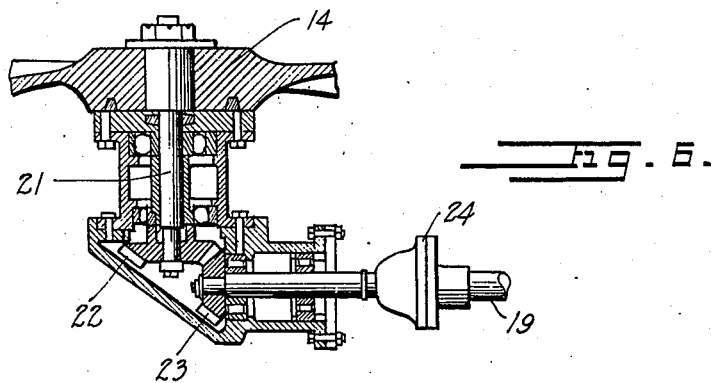
Figure 4:
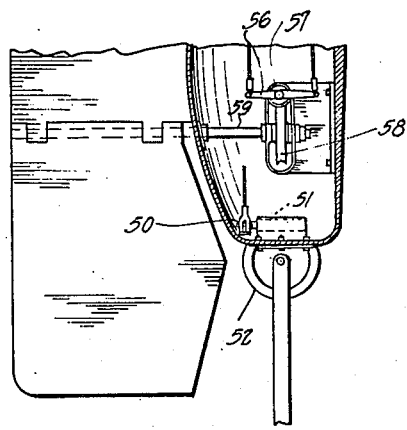
Figure 5:
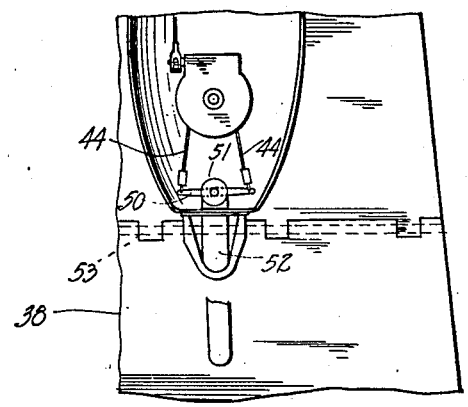

My invention is illustrated in the accompanying drawings, forming part of this application, in which Figure 1 is a side elevation of an airplane embodying my invention, Figure 2 is a top plan view of the device shown in Figure 1, Figure 3 is a sectional view taken substantially along the line 3—3 of Figure 1, Figure 4 is an enlarged sectional detail view of a portion of my device, Figure 5 is a plan view of the device shown in Figure 4, Figure 6 is a sectional detail view of a portion of the driving mechanism for one of the propellers, Figure 7 is a detail view of the steering control for the rudders, and Figure 8 is a side elevation of the device shown in Figure 7.

In carrying out my invention, I make use of a fuselage 1, such as that shown in Figures 1 and 2. The fuselage 1 is provided with an upper deck 2 spaced away from the top surface of the fuselage. Wings 3 and 4 are pivotally mounted at 5 and 6 between the upper deck 2 and the fuselage 1. The mounting of the wings 3 and 4 is such that the wings may be pivoted upon axes 5 and 6 for bringing the wings substantially parallel with the fuselage 1.

Means for swinging the wings 3 and 4 about the axes 5 and 6 consists of arms 7 and 8 pivotally connected at 9 and 10 with the wings 3 and 4 and with a connecting rod 11 associated with an air plunger 12 within an air cylinder 13. Thus it will be seen that movement of the plunger 12 will result in a relative movement of the wings 3 and 4.

Propellers 14 and 15 are mounted underneath the wings 3 and 4 and mounted for rotation in a plane substantially parallel with the wings 3 and 4. The propellers 14 and 15 are supported upon the fuselage 1 by means of suitable brace members 16 and 17. The propellers are operatively connected with a motor 18 by means of revolving shafts 19 and 20. The propellers are provided with suitable bearing elements 21, such as that shown in Figure 6, upon which a bevel gear 22 is mounted and disposed in engagement with a similar bevel gear 23 which is mounted upon each of the shafts 19 and 20. Each of the revolving shafts is provided with a universal joint 24. It will now be seen that the bearing element 21, as shown in Figure 6, which provides the axis about which the propeller 14 revolves is disposed in a plane at right angles to the revolving shaft 19. The mechanism associated with each of propellers is identical in construction and operation so that the description of one is adequate for both.

The revolving shafts 19 and 20 are provided with suitable throw-out disc clutches 25 and 26, as shown in Figure 2. The revolving shafts are operatively connected with an air compressor 27 by means of chains 28 and 29. The chains 28 and 29 pass around sprockets 30 and 31 which are carried by shafts 32 and 33 associated with the air compressor 27. Sprockets 34 and 35 are mounted upon the shafts 19 and 20 for completing the driving mechanism connecting the shafts and the air compressor 27. Suitable bracing B is provided for rigidly supporting the propellers 14 and 15.

Referring now to Figures 1 and 2, it will be noted that I have provided a vertical rudder 36 pivotally mounted at 37 upon the rear end of the fuselage 1 and a horizontal rudder 38 pivotally mounted at 39. Means for actuating the vertical rudder 36 consists in the provision of a control mechanism M, such as shown in Figures 7 and 8, mounted upon the floor portion 40 of the fuselage 1 in the customary position for convenient access to the operator of the machine. The control mechanism consists of a hand wheel 41 which is rotatably mounted upon a pivot 42. A suitable wheel 43 is associated with the hand wheel around which a control cable 44 is passed. The pivot 42 is mounted upon a swinging support 45 which is pivotally mounted at 46 upon a base member 47. The control cable 44 passes around suitable pulleys 48 and 49. The control cable 44 passes rearwardly and is operatively connected with a horizontal rudder lever 50. The lever 50 is secured to a worm 51 which is disposed in operative engagement with a worm gear 52, see Figures 4 and 5. The worm gear 52 is rigidly secured to a shaft 53 which is adapted to move the horizontal rudder 38 when the worm gear 52 is rotated. The shaft 53 forms the pivot 39 shown in Figure 1. It will thus be seen that when the hand wheel 41 is rotated, the cable 44 will be moved, thereby causing the worm 51 to rotate for moving the horizontal rudder 38.

Control cables 54 and 55 are connected with the swinging support 45, as shown in Figures 7 and 8. These cables run rearwardly and are connected with a vertical rudder lever 56 which is operatively connected with a worm 57. The worm 57 is operatively connected with a worm gear 58 mounted upon a shaft 59 which forms the pivot 37 shown in Figure 1. The swinging support 45 may be oscillated about the pivot 46 for moving the cables 54 and 55. Oscillation of the swinging support 45 will of course cause a relative movement of the vertical rudder 36.

The fuselage 1 is provided with the usual running gear wheels W and a tail skid S, such as that shown in Figure 1. These features however form no part of the present invention.

When the airplane is upon the ground preparatory to flying, the wings are moved back substantially adjacent the fuselage and the motor is started for actuating the propellers. The constriction of the air is such at this time that the airplane will be caused to move forwardly upon the ground, the speed being based upon the rate of rotation of the propellers, and when the wings are moved into the lateral position shown in Figure 2 and the horizontal rudder moved into the upper position shown in Figure 1, the airplane will begin to rise vertically and at the proper time the horizontal rudder is moved into a plane substantially in longitudinal alignment with the fuselage.

When flying, the airplane may be turned to the right or left by swinging the support 45 about the pivot 46, thus actuating the worm 57, the worm gear 58 and the vertical rudder 36. If it is desired to raise or lower the airplane in flight, the hand wheel 41 is turned for moving the cable 44. Movement of the cable will rotate the worm 51, the worm gear 52 and the horizontal rudder 38.

During the operation of the motor 18, the compressor 27 will be operated through the medium of the chains 28 and 29 for creating a supply of compressed air. Suitable storage tanks 60 for the air may be provided within the fuselage. The compressor 27 however may be cut off from the motor 18 by disengaging clutch mechanisms C'. Should the motor 18 for any reason stop during the flight of the airplane, the propellers 14 and 15 may continue to operate by supplying compressed air to the air compressor 27 for causing a rotation of the shafts 32 and 33. Since the chains 28 and 29 connect the shafts 32 and 33 with the shafts 19 and 20, it will be seen that the propellers are operatively connected with the compressor. During flight, the propellers may be disconnected from the motor by reason of the clutches 25 and 26. Since the clutches 25 and 26 may be actuated independently of each other, one of the propellers may be slowed up during flight and in this manner providing an airplane which may be turned in a horizontal plane substantially about a pivot point.

Suitable means may be provided for connecting the cylinder 13 with the compressed air supply so that the movement of the wings may be easily and quickly moved by controlling the flow of compressed air to the cylinder 13.

It will be seen that when the wings are disposed horizontally with respect to the fuselage and the propellers are revolving for constricting the air against the upper surface of the wings, the pressure at that point will be reduced so that the airplane will ascend vertically. This is an important feature in connection with my invention in that it enables an airplane to ascend or descend without the necessity of realtively large landing fields.

I claim:

1. An airplane comprising a fuselage, wings pivotally secured thereto, propellers carried by the fuselage and arranged for rotation in a plane parallel to the wings, means for driving the propellers, compressed air actuated means for moving said wings about their pivots, an air compressor, and means operatively connecting said compressor with said first named means.

2. An airplane comprising a fuselage provided with an upper deck, wings pivotally carried by the fuselage and disposed beneath the upper deck and normally extending laterally therefrom, and propeller means disposed beneath each of the wings, said propeller means, said deck, and said wings being arranged to cause a downward flow of air around the fuselage, the edges of said deck, and said wings, said propeller means being arranged to force a downward flow of air beneath the propeller, the upper surface of said deck being convex for deflecting the air downwardly when the plane is lifted upwardly by said propeller, said wings being adapted to be folded rearwardly when the plane is being lifted off the ground.

Signed at Shelby, in the county of Toole and State of Montana, this 7th day of March, 1928.

FRANK RUTRLE.